United States Patent [19]

Arikawa

[11] 4,425,622
[45] Jan. 10, 1984

[54] SKID CONTROL SYSTEM

[75] Inventor: Tetsuro Arikawa, Yokosuka, Japan

[73] Assignee: Nippon Air Brake Co., Ltd., Kobe, Japan

[21] Appl. No.: 227,604

[22] Filed: Jan. 23, 1981

[30] Foreign Application Priority Data

Jan. 24, 1980 [JP] Japan ................................. 55-7171

[51] Int. Cl.³ ............................................. B60T 8/08
[52] U.S. Cl. ..................................... 364/426; 303/91; 303/92; 303/93
[58] Field of Search .................................. 303/91-93; 364/426

[56] References Cited

U.S. PATENT DOCUMENTS 3,944,288  3/1976  Bertolaki ............................... 303/92
4,003,607  1/1977  Haney et al. ........................... 303/92
4,013,324  3/1977  Quon ...................................... 303/92

Primary Examiner—J. V. Truhe
Assistant Examiner—Saul M. Bergmann
Attorney, Agent, or Firm—McDougall, Hersh & Scott

[57] ABSTRACT

A skid control system for a vehicle having a wheel and a brake for the wheel includes a wheel speed sensor for providing an output signal representative of the speed of the wheel; a skid control circuit arrangement responsive to the output signal of the wheel speed sensor for relieving and reapplying the brake for the wheel; a failure detecting circuit for detecting failure of the skid control circuit arrangement, a battery and a safety device responsive to the detecting signal of the failure detecting circuit for disconnecting the skid control circuit arrangement from the battery and gradually increasing braking action for the wheel for a predetermined time.

15 Claims, 10 Drawing Figures

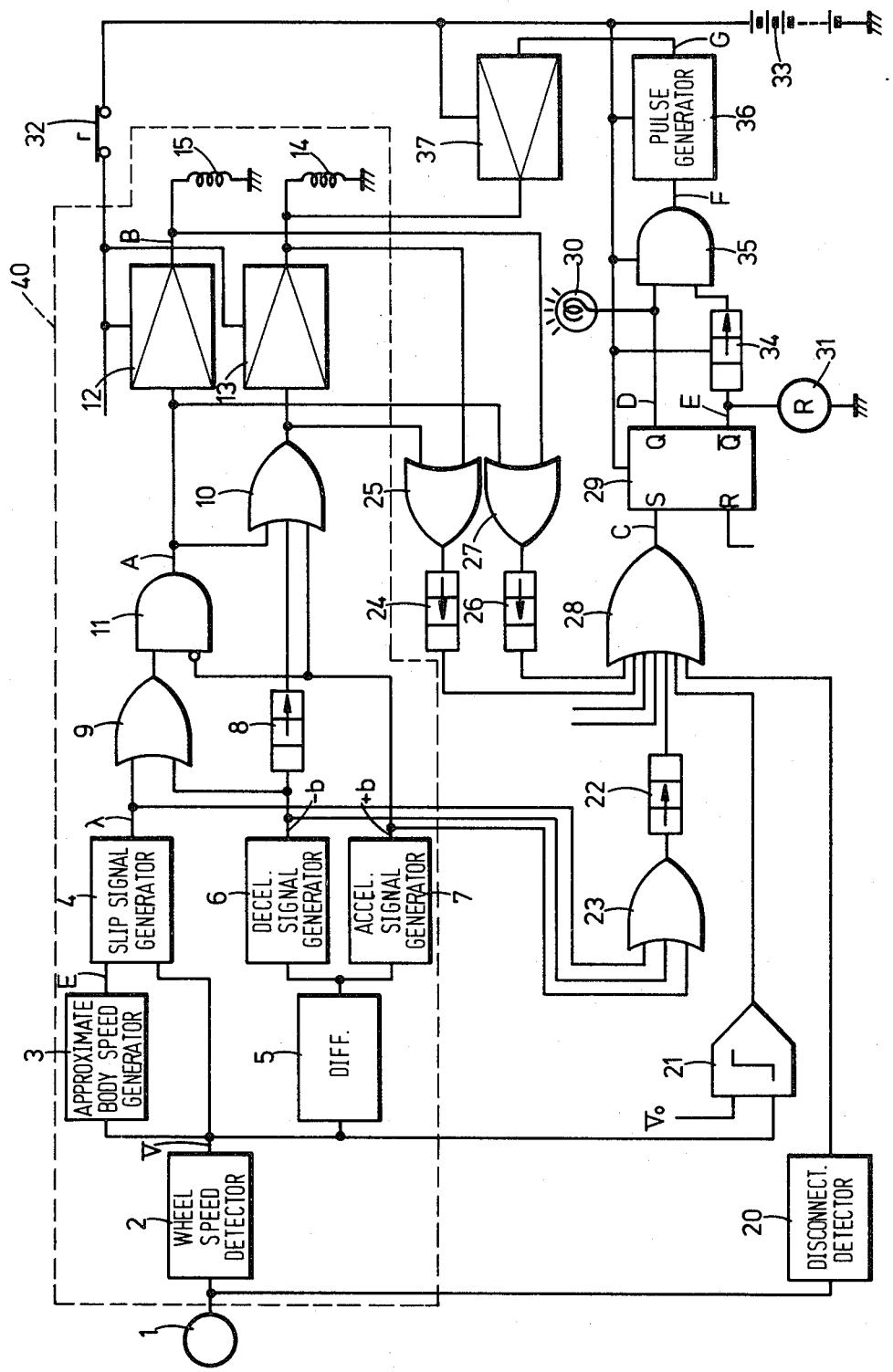

SKID CONTROL SYSTEM

BACKGROUND OF THE INVENTION

1. Field of the Invention

This invention relates to a skid control system for a vehicle having a wheel and a brake for the wheel, and more particularly to a safety device of a skid control system in which skid control operation is stopped on failure of a constituent circuit.

2. Description of the Prior Art

A skid control system is used for a vehicle, by which skid control operation for the wheel is performed to avoid a locked wheel condition and obtain good braking performance on any road. In skid control operation, the brake pressure to the wheel is alternately relieved and reapplied, or relieved, maintained constant and reapplied. When failure occurs in a constituent circuit of a skid control circuit arrangement such as a wheel speed detector, a deceleration signal generator, or slip signal generator, the skid control operation is stopped by a safety device which becomes operative to a failure signal. The vehicle is then changed over from the skid control condition into the normal braking condition.

When the brake fluid pressure of the master cylinder operated by the driver is further higher than the skid-controlled brake pressure to the wheel on the failure of the constituent circuit, the brake pressure to the wheel rapidly rises up immediately after the vehicle is changed over from the skid control condition into the normal braking condition. In that case, there is the fear that the wheel is suddenly locked, the steering of the vehicle is lost, or the behavior of the vehicle becomes disorderly.

SUMMARY OF THE INVENTION

An object of this invention is to provide a safety device of a skid control system in which, even when failure occurs in a constituent circuit, and the braking condition of the vehicle is changed over, the wheel can be prevented from unexpectedly locking.

Another object of this invention is to provide a safety device of a skid control system in which the driver can brake the vehicle at ease, even when failure occurs in a constituent circuit, and the braking condition of the vehicle is changed over.

In accordance with an aspect of this invention, a skid control system for a vehicle having a wheel and a brake for the wheel includes: (A) a wheel speed sensor for providing an output signal representative of the speed of the wheel; (B) skid control circuit means responsive to the output signal of the wheel speed sensor for relieving and reapplying the brake for the wheel; (C) failure detecting means for detecting failure of the skid control circuit means; (D) power source means connected to said skid control circuit means; the (E) valve means having inlet and outlet valves including solenoid portions respectively for controlling the brake fluid pressure for said wheel; and (F) safety device responsive to the detecting signal of the failure detecting means for disconnecting the skid control circuit means from the power source means and gradually increasing the brake fluid pressure for said wheel by energizing and deenergizing the solenoid portion of said inlet valve alternately for a predetermined time.

The foregoing and other objects, features, and advantages of the present invention will be more readily understood upon consideration of the following detailed description of the preferred embodiment of the invention, taken in conjunction with the accompanying drawings.

BRIEF DESCRIPTION OF THE DRAWINGS

FIG. 1 is a block diagram of a skid control system according to one embodiment of this invention.

DETAILED DESCRIPTION OF THE PREFERRED EMBODIMENTS

Figure 2A:
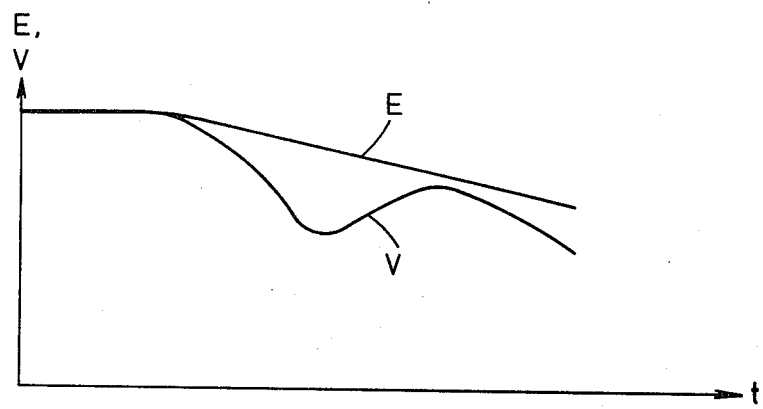
FIG. 2A to FIG. 2I are time charts for explaining operation of the skid control system of FIG. 1.

Next, a skid control system according to one embodiment of this invention will be described with reference to the drawings.

In FIG. 1, a wheel speed sensor 1 is associated with one wheel of the vehicle. Although not shown, other wheel speed sensors are associated with the other wheels of the vehicle, and respectively connected to the similar block diagrams to the block diagram shown in FIG. 1. For example, the wheel speed sensor 1 is associated with one of the rear wheels of the vehicle. However, it may be associated with the drive shaft between the vehicle transmission and the differential gear so as to sense the average speed of the rear wheels of the vehicle.

The wheel speed sensor 1 generates a pulse signal having a frequency proportional to the rotational speed of the wheel, and it is connected to a skid control circuit arrangement 40 enclosed by dashed lines in FIG. 1. The skid control circuit arrangement 40 has the conventional construction. The pulse signal of the wheel speed sensor 1 is supplied to a wheel speed detecting circuit 2 of the skid control circuit arrangement 40 to be converted to a wheel speed signal V having analogue or digital value proportional to the rotational speed of the wheel. In the skid control circuit arrangement 40, the wheel speed signal V is supplied to an approximate body (vehicle) speed generator 3, a slip signal generator 4 and a differentiator 5. Since the actual speed of the vehicle cannot be conveniently measured directly, the vehicle speed is simulated by the approximate body speed generator 3. The simulated vehicle speed signal E (shown in FIG. 2A) from the approximate body speed generator 3 is supplied to the slip signal generator 4 to determine the slip of the wheel. In the slip signal generator 4, the simulated vehicle speed signal or approximate body speed signal E is compared with the wheel speed signal V. Generally, a slip $\lambda$ is given by the following formula:

$$\lambda = 1 - (\text{wheel speed}/\text{vehicle speed})$$

When $(1-V/E)$ is larger than a predetermined threshold slip (for example, 0.15), the slip signal generator 4 generates a slip signal $\lambda$, namely the output of the slip signal generator 4 becomes higher as "1".

The wheel speed signal V of the wheel speed detecting circuit 2 is differentiated with respect to time in the differentiator 5. A signal V proportional to the acceleration or deceleration of the wheel is generated from the differentiator 5, and it is supplied to a deceleration signal generator 6 and an acceleration signal generator 7. In the deceleration signal generator 6, the output signal V of the differentiator 5 is compared with a predetermined threshold deceleration which is, for example, equal to $-1.5$ g. When the absolute value of the signal V is larger than the predetermined threshold deceleration, the deceleration signal generator 6 generates a deceleration signal −b, namely the output of the deceleration signal generator 6 becomes higher as "1". In the acceleration signal generator 7, the output signal V of the differentiator 5 is compared with a predetermined threshold acceleration which is, for example, equal to 0.5 g. When the signal V is larger than the predetermined threshold acceleration, the acceleration signal generator 7 generates an acceleration signal +b, namely the output of the acceleration signal generator 7 becomes higher as "1".

In the skid control circuit arrangement 40, an output terminal of the deceleration signal generator 6 is connected to an input terminal of an OFF-delay timer 8 and one input terminal of an OR gate 9. An output terminal of the slip signal generator 4 is connected to another input terminal of the OR gate 9. The output of the OFF-delay timer 8 becomes higher as "1" at the same time when the deceleration signal −b is generated from the deceleration signal generator 6. It is maintained at the higher level for a predetermined time, for example, 0.1 second, after the deceleration signal −b dissipates, namely the output of the deceleration signal generator 6 becomes lower as "0". Then, it becomes lower as "0".

An output terminal of the OFF-delay timer 8 is connected to a first input terminal of an OR gate 10. An output terminal of the OR gate 9 is connected to an input terminal of an AND gate 11. An output terminal of the acceleration signal generator 7 is connected to a negation input terminal of the AND gate 11, and a second input terminal of the OR gate 10. An output terminal of the AND gate 11 is connected to a third input terminal of the OR gate 10, and a current amplifier 12. An output terminal of the OR gate 10 is connected to another current amplifier 13.

An output terminal of the current amplifier 12 is connected to a solenoid portion 15 of an outlet valve (not shown), and an output terminal of the other current amplifier 13 is connected to a solenoid portion 14 of an inlet valve (not shown). The outlet valve and inlet valve are called also "discharge valve" and "cut-off valve", respectively. When the output of the OR gate 10 becomes higher, the current amplifier 13 supplies current to the solenoid portion 14 of the inlet valve to energize the latter. When the output of the AND gate 11 becomes higher, the current amplifier 12 supplies current to the solenoid portion 15 of the outlet valve to energize the latter. Although not shown, the inlet valve and outlet valve have well-known constructions. When the solenoid portions 14 and 15 are not energized, the inlet and outlet valves make a master cylinder (not shown) communicate with a wheel cylinder (not shown) mounted on the wheel, and the brake pressure to the wheel cylinder is increased. When both of the solenoid portions 14 and 15 are energized, the brake pressure to the wheel cylinder is decreased by function of the inlet and outlet valves. And when only the solenoid portion 14 of the inlet valve is energized, the brake pressure to the wheel cylinder is maintained constant.

Next, there will be described a failure detecting circuit and a safety circuit associated with the failure detecting circuit in FIG. 1.

A disconnection detector 20 is connected to the connecting point between the wheel speed sensor 1 and the wheel speed detector 2. An output terminal of the disconnection detector 20 is connected to a first input terminal of an OR gate 28. When any electrical disconnection occurs in the wheel speed sensor 1 or the wheel speed detector 2 is disconnected from the wheel speed sensor 1, the output of the disconnection detector 20 becomes higher as "1" to generate a disconnection signal or failure signal.

A comparator 21 is connected to the output terminal of the wheel speed detector 2. The wheel speed signal V is compared with a predetermined value Vo in the comparator 21. An output terminal of the comparator 21 is connected to a second input terminal of the OR gate 28. When the value of the wheel speed detector 2 becomes extraordinary due to any trouble, the output of the comparator 21 becomes higher as "1" to generate a failure signal.

The output terminals of the slip signal generator 4, deceleration signal generator 6 and acceleration signal generator 7 in the skid control circuit arrangement 40 are connected to input terminals of an OR gate 23. An output terminal of the OR gate 23 is connected through an ON-delay timer 22 to a third input terminal of the OR gate 28. The output of the ON-delay timer 22 does not become higher as "1" at the same time when the output of the OR gate 23 becomes higher as "1", but it becomes higher as "1" after a predetermined time (delay time), for example 0.15 seconds, from that time. When the slip signal λ, the deceleration signal −b or the acceleration signal +b continues for longer than the predetermined time (delay time) of the ON-delay timer 22, it is judged that failure has occured in any of the slip signal generator 4, deceleration signal generator 6 and acceleration signal generator 7, and so the OR gate 23 and ON-delay timer 22 generates a failure signal.

The output terminal of the OR gate 10 is connected to one input terminal of an OR gate 25, and the output terminal of the current amplifier 13 is connected to another input terminal of the OR gate 25. An output terminal of the OR gate 25 is connected through an ON-delay timer 24 to a fourth input terminal of the OR gate 28. When the output of the OR gate 10 or current amplifier 13 is maintained at the higher level for longer than a predetermined delay time of the ON-delay timer 24, for example 0.15 seconds, the OR gate 25 and the ON-delay timer 24 generates a failure signal.

The output terminal of the AND gate 11 is connected to one input terminal of an OR gate 27, and the output terminal of the current amplifier 12 is connected to another input terminal of the OR gate 27. An output terminal of the OR gate 27 is connected through an ON-delay timer 26 to a fifth input terminal of the OR gate 28. When the output of the AND gate 11 or current amplifier 12 is maintained at the higher level for longer than a predetermined delay time for example 0.15 seconds, of the ON-delay timer 26, the OR gate 27 and the ON-delay timer 26 generates a failure signal.

Input terminals or output terminals of any other circuit elements in the skid control circuit arrangement 40 may be connected to the other input terminal of the OR gate 28. An output terminal of the OR gate 28 is connected to an input terminal S of a flip-flop 29. A Q-output terminal of the flip-flop 29 is connected to a warning lamp 30 and one input terminal of an AND gate 35. A Q-output terminal of the flip-flop 29 is connected to a relay 31, and through an OFF-delay timer 34 to another input terminal of the AND gate 35. A movable contact 32 of the relay 31 is arranged in a power source line connected to a power source or battery 33 for supplying electric power to the skid control circuit arrangement 40. When the flip-flop 29 is in the reset condition, or when the skid control circuit arrangement 40 is in order, the relay 31 is energized with the Q output of the flip-flop 29 to close the movable contact 32 for connecting the power source 33 with the skid control circuit arrangement 40.

An output terminal of the AND gate 35 is connected to a pulse generator 36. An output terminal of the pulse generator 36 is connected to an input terminal of a current amplifier 37. An output terminal of the current amplifier 37 is connected to the solenoid portion 14 of the inlet valve. Power source supply terminals of the flip-flop 29, OFF-delay timer 34, AND gate 35, pulse generator 36 and current amplifier 37 are connected directly to the power source 33. Although not shown, power source supply terminals of the other circuit elements of the failure detecting circuit and safety circuit are connected directly to the power source 33.

When any of the input terminals of the OR gate 28 receives the failure signal (high level signal), the output of the OR gate 28 becomes higher as "1" to set the flip-flop 29. The Q-output of the flip-flop 29 energizes the warning lamp 30. Accordingly, the failure of the skid control circuit arrangement 40 is indicated to the driver by the lighting of the warning lamp 30. The pulse generator 36 starts to generate pulse signals with the output "1" of the AND gate 35. The pulse signals G from the pulse generator 36 are shown in FIG. 2I. The ratio of the high level interval to the low level interval is constant. The pulse generator 36 operates for a predetermined time (OFF delay time) of the OFF delay timer 34. The pulse signals G are amplified by the current amplifier 37, and the amplified pulse signals are supplied to the solenoid portion 14 of the inlet valve.

As soon as the flip-flop 29 is set with the output of the OR gate 28, the relay 31 is deenergized to open the movable contact 32 and therefore to disconnect the skid control circuit arrangement 40 from the power source 33.

Next, there will be described operation of the skid control system of FIG. 1 with reference to FIG. 2A to FIG. 2I.

FIG. 2A to FIG. 2I show the case that failure occurs in the current amplifier 12 of the skid control circuit arrangement 40, and therefore that current flows through the solenoid portion 15 of the outlet valve for extraordinarily long time.

Figure 2B:
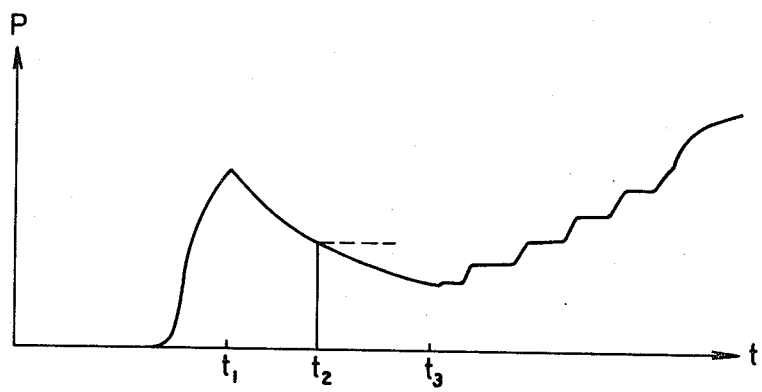
Figure 2C:

When the driver rapidly brakes the running vehicle by treading a brake pedal (not shown), the brake pressure P to the wheel cylinder rises up rapidly as shown in FIG. 2B, and the wheel speed V decreases rapidly as shown in FIG. 2A. As above described, the approximate vehicle speed signal E is generated from the approximate body speed generator 3 as shown in FIG. 2A. At time $t_1$, the output of the deceleration signal generator 6 or slip signal generator 4 becomes higher. In other words, the deceleration signal generator 6 generates the deceleration signal $-b$, or the slip signal generator 4 generates the slip signal $\lambda$. Accordingly, the output A of the AND gate 11 becomes higher, as shown in FIG. 2C, and therefore currents are supplied from the current amplifiers 12 and 13 into the solenoid portions 14 and 15 of the not-shown inlet and outlet valves. The latters are actuated to lower the brake pressure P to the wheel cylinder. Meanwhile, the deceleration signal $-b$ and the slip signal $\lambda$ dissipate with the lowering of the brake pressure P. And at time $t_2$, the output A of the AND gate 11 and the output of the OR gate 10 become lower as "0". If the current amplifiers 12 and 13 are in order, the solenoid portions 14 and 15 of the inlet valve and outlet valve are deenergized to reapply the brake to the wheel. When the acceleration signal $+b$ is generated at time $t_2$, the output signal A of the AND gate 11 becomes lower as "0", but the output of the OR gate 10 is maintained at the higher level. If the current amplifiers 12 and 13 are in order, the solenoid portion 15 of the outlet valve is deenergized, while the solenoid portion 14 of the inlet valve is maintained energized, and the brake pressure P to the wheel cylinder is maintained at constant, as shown by the dash line in FIG. 2B.

However, when failure occurs in the current amplifier 12, current still continues to flow through the solenoid portion 15 of the outlet valve also after time $t_2$, and the brake pressure P continues to lower as shown in FIG. 2B, without reapplying the brake or maintaining the brake.

Figure 2D:
Figure 2E:

The current signal B of the current amplifier 12 as shown in FIG. 2D is supplied through the OR gate 27 to the ON-delay timer 26. Since the current signal B of the failed current amplifier 12 is maintained at the higher level for longer than the delay time of the ON delay timer 26 which is, for example, 0.15 seconds, the output of the ON delay timer 26 becomes higher as "1". Accordingly, the ON-delay timer 26 generates the failure signal of the current amplifier 12 at time $t_3$.

Figure 2F:
Figure 2G:
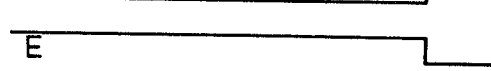

The failure signal from the ON delay timer 26 is supplied through the OR gate 28 to the set terminal S of the flip-flop 29 to set the latter. The Q-output D of the flip-flop 29 as shown in FIG. 2F becomes higher as "1" to energize the warning lamp 30 to inform the failure of the skid control circuit arrangement 40 of the driver. On the other hand, the Q output E of the flip-flop 29 as shown in FIG. 2G becomes lower as "0" with the output C of the OR gate 28. The relay 31 is deenergized to open the movable contact 32 and to disconnect the current amplifier 12 and the other circuit elements of the skid control circuit arrangement 40 from the power source 33. The function of the current amplifier 12 is forcedly stopped.

The output of the OFF delay timer 34 is maintained at the higher level for the delay time after the Q output E of the flip-flop 29 becomes lower. The output of the AND gate 35 becomes higher at the same time when the failure signal is supplied to the set terminal S of the flip-flop 29. The pulse generator 36 starts to generate the pulse signals G as shown in FIG. 2I. The pulse signals G are amplifed by the current amplifier 37, and supplied to the solenoid portion 14 of the inlet valve. The latter is alternately energized and deenergized with the output G of the pulse generator 36. The brake pressure P to the wheel cylinder is increased in the stepwise manner shown in FIG. 2B. In other words, the brake pressure P is gradually increased to avoid the wheel locking.

Figure 2H:
Figure 2I:

At the lapse of the predetermined time of the OFF delay timer 34, between about 0.4 and 1.0 seconds, after the failure signal is generated to set the flip-flop 29, the output signal of the OFF-delay timer 34, and therefore the output signal F of the AND gate 35 as shown in FIG. 2H becomes lower. The operation of the pulse generator 36 stops to deenergize the solenoid portion 14 of the inlet valve. The delay time of the OFF delay timer 34 is so long that the brake pressure P does not rapidly rise with the deenergization of the solenoid portion 14, and the danger of the unexpected wheel locking can be surely avoided.

There has been described the case that the current amplifier 12 fails. However, the above-described operation is performed also in the case that another circuit element such as the slip signal generator 4 or the wheel speed detector 1 fails.

In the above embodiment, the pulse generator 36 to stepwisely increase the brake pressure P is used in order gradually to increase the brake pressure P after occurrence of failure signal. However, any other means to gradually increase the brake pressure P may be used instead of the pulse generator 36. For example, a throttle valve may be arranged in series with the inlet valve for that purpose, which becomes operative with the failure signal.

While the preferred embodiment has been described, variations thereto will occur to those skilled in the art within the scope of the present inventive concepts which are delineated by the following claims.

What is claimed is:

1. A skid control system for a vehicle having a wheel and a brake for the wheel comprising:
    (a) a wheel speed sensor for providing an output signal representative of the speed of said wheel;
    (b) skid control circuit means responsive to the output signal of said wheel speed sensor for relieving and reapplying the brake for said wheel;
    (c) failure detecting means for detecing failure of said skid control circuit means;
    (d) power source means connected to said skid control circuit means;
    (e) means for controlling the brake pressure for said wheel; and
    (f) a safety device operatively connected to the brake pressure control means responsive to a detecting signal of said failure detecting means for disconnecting said skid control circuit means from said power source means and gradually increasing the brake pressure for said wheel by activating and deactivating the brake pressure control means alternately for a predetermined time, said safety device includes timer means actuated with said failure detecting signal brake pressure to drive said control means.

2. A skid control system according to claim 1, in which said failure detecting means generates the failure detecting signal, when said skid control circuit means generates a control signal for relieving the brake for longer than a second predetermined time.

3. A skid control system according to claim 2, in which said skid control circuit means includes a slip signal generator, and said control signal is obtained from said slip signal generator.

4. A skid control system according to claim 2, in which said skid control circuit means includes a deceleration signal generator, and said control signal is obtained from said deceleration signal generator.

5. A skid control system according to claim 2, in which said skid control circuit means includes amplifier means, and said control signal is obtained from said amplifier means.

6. A skid control system according to claim 2, in which said failure detecting means includes timer means to set said second predetermined time.

7. A skid control system according to claim 6, in which said timer means is on an ON delay timer.

8. A skid control system according to claim 1, in which said timer means is an OFF delay timer responsive to said failure detecting signal.

9. A skid control system according to claim 8, in which said safety device includes a flip-flop and an AND gate, a Q-output terminal of said flip-flop is connected to said warning means and one input terminal of said AND gate, a Q-output terminal of said flip-flop is connected to said relay means and an input terminal of said OFF delay timer, an output terminal of said OFF delay timer is connected to another input terminal of said AND gate, and an output terminal of said AND gate is connected to an input terminal of said pulse generator to drive the latter, said flip-flop being set by the failure detecting signal.

10. A skid control system according to claim 9, in which said safety device is connected directly to said power source means.

11. A skid control system according to claim 10, in which an output terminal of said pulse generator is connected to said solenoid portion of the inlet valve.

12. A skid control system according to claim 1, in which said output terminal of the pulse generator is connected through amplifier means to said solenoid portion of the inlet valve.

13. A skid control system according to claim 11, in which said skid control circuit means includes first and second amplifiers connected respectively to the solenoid portions of said inlet and outlet valves, and said control signal is obtained from the respective ones of said first and second amplifiers.

14. A skid control system according to claim 2, in which said safety device includes a pulse generator for stepwisely increasing the brake fluid pressure for said wheel.

15. A skid control system according to claim 14, in which said safety device includes warning means and relay means, said warning means being energized with said failure detecting signal, and said relay means being deenergized with said failure detecting signal to disconnect said skid control circuit means from said power source means through the movable contact of said relay means arranged between said skid control circuit means and said power source means.

* * * * *